US012804655B2

(12) United States Patent
Lin et al.

(10) Patent No.: US 12,804,655 B2
(45) Date of Patent: Nov. 17, 2026

(54) RESOURCE SELECTION AND REPORTING IN SIDELINK COMMUNICATIONS

(71) Applicant: GUANGDONG OPPO MOBILE TELECOMMUNICATIONS CORP., LTD., Dongguan (CN)

(72) Inventors: Huei-Ming Lin, South Yarra (AU); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 958 days.

(21) Appl. No.: 17/660,609

(22) Filed: Apr. 25, 2022

(65) Prior Publication Data

US 2022/0256525 A1 Aug. 11, 2022

Related U.S. Application Data

(63) Continuation of application No. PCT/CN2020/125391, filed on Oct. 30, 2020.

(Continued)

(51) Int. Cl.
*H04W 72/20* (2023.01)
*H04W 72/02* (2009.01)

(52) U.S. Cl.
CPC ........... *H04W 72/20* (2023.01); *H04W 72/02* (2013.01)

(58) Field of Classification Search
CPC .............................. H04W 72/20; H04W 72/02

(Continued)

(56) References Cited

U.S. PATENT DOCUMENTS

| | | | | |
|---|---|---|---|---|
| 2018/0132254 A1 | 5/2018 | Chae et al. | | |
| 2019/0150135 A1* | 5/2019 | Lee | H04W 4/70 | 370/312 |

(Continued)

FOREIGN PATENT DOCUMENTS

| | | | |
|---|---|---|---|
| CN | 109923882 A | 6/2019 | |
| EP | 3651519 A1 | 5/2020 | |
| EP | 3874852 A1 | 9/2021 | |
| KR | 20190017632 A | 2/2019 | |
| WO | 2018031458 A1 | 2/2018 | |

(Continued)

OTHER PUBLICATIONS

3GPP RAN WG2 Meeting #103bis—R2-1814016—Chengdu, China, Oct. 8-12, 2018—InterDigital Inc., Resource Allocation Features to Support NR V2X Requirements (4 pages).

(Continued)

*Primary Examiner* — Chi Tang P Cheng
(74) *Attorney, Agent, or Firm* — ASHURST PERKINS COIE US LLP

(57) ABSTRACT

A method, an apparatus, and a system for sidelink resource selection and reporting scheme, for avoiding dropped sidelink transmissions due to overlapping, conflicting, or colliding sidelink resources for LTE sidelink and/or the NR sidelink communications, are provided. Resource scheduling and/or selection information from one RA may be provided to the other RA, which may be performed internally within a UE between the LTE RA and the NR RA when they are operating in UE autonomous resource selection modes. Additionally, or alternatively, the resource selection information from one RA may be reported to a controlling base station to avoid allocating overlapping resources when making resource scheduling decision by the base station for the other RA.

9 Claims, 8 Drawing Sheets

Related U.S. Application Data

(60) Provisional application No. 62/936,770, filed on Nov. 18, 2019.

(58) Field of Classification Search
USPC .......................................................... 370/329
See application file for complete search history.

(56) References Cited

U.S. PATENT DOCUMENTS

| | | | | |
|---|---|---|---|---|
| 2020/0146066 | A1 | 5/2020 | Nguyen et al. | |
| 2020/0169985 | A1* | 5/2020 | Lei ........................ | H04W 76/14 |
| 2021/0045088 | A1 | 2/2021 | Cai et al. | |

FOREIGN PATENT DOCUMENTS

| | | | |
|---|---|---|---|
| WO | 2018149265 | A1 | 8/2018 |
| WO | 2019154333 | A1 | 8/2019 |

OTHER PUBLICATIONS

3GPP TSG RAN WG2 Meeting #106—R2-1906486—Reno, USA, May 13-17, 2019—ZTE, Sanechips, Consideration on multi-mode co-existence (4 pages).

3GPP TSG RAN WG2 Meeting #107bis—R2-1912378—Chongqing, China, Oct. 14-18, 2019—ZTE Corporation, Sanechips, Consideration on multi-mode co-existence (4 pages).

International Search Report issued Jan. 28, 2021 of PCT /CN2020/125391 (3 pages).

Extended European Search Report for European Application No. 20889492.3 issued Oct. 7, 2022. 10 pages.

Fujitsu "Dynamic Resource Selection for NR Sidelink" R1-1913273; 3GPP TSG RAN WG1 #99; Reno, USA; Nov. 18-22, 2019. 19 pages.

First Office Action of the European application No. 20889492.3, issued on Nov. 29, 2023. 9 pages.

Second Office Action of the European application No. 20889492.3, issued on Oct. 31, 2024. 10 pages.

Notice of Preliminary Rejection of Korean application No. 10-2022-7018111 issued on Jul. 9, 2025, 19 pages with English translation.

Intel Corporation, R1-1902488, In-Device Coexistence for NR V2X Sidelink Communication, 3GPP TSG RAN WG1 #96, 3GPP server, publication date Feb. 16, 2019, 13 pages.

Notice of Preliminary Rejection of Korean application No. 10-2022-7018111 issued on Mar. 27, 2026, 18 pages with English translation.

LG Electronics, R1-1907789, Discussion on resource allocation for NR sidelink Mode 2, 3GPP TSG RAN WG1 #97, Reno, USA, May 13-17, 2019, 12 pages.

* cited by examiner

RESOURCE SELECTION AND REPORTING IN SIDELINK COMMUNICATIONS

CROSS-REFERENCE TO RELATED APPLICATIONS

The present application is a continuation application of International PCT Application No. PCT/CN2020/125391, filed on Oct. 30, 2020, which claims priority of U.S. provisional patent application No. 62/936,770, filed on Nov. 18, 2019. The above-identified applications are hereby incorporated by reference in their entireties.

BACKGROUND

In the development of vehicle-to-everything (V2X) communication, several wireless radio access technologies (RATs) have been created by different professional association or standards development organizations, including the 802.11p from Institute of Electrical and Electronics Engineers (IEEE) and the long-term evolution (LTE) sidelink communication for V2X (LTE-V2X) from 3rd Generation Partnership Project (3GPP). Under 3GPP, a new RAT for the V2X communication based on the latest 5th generation (5G) new radio (NR) cellular technology, commonly referred as NR-V2X, is being developed. In many cases, therefore, a single user equipment (UE) is expected to incorporate both LTE-V2X and NR-V2X RATs and communicate with other UEs. However, when a UE, having both LTE-V2X RAT and NR-V2X RAT within, has limited number of transmission (Tx)/reception (Rx) chains or available total power, the UE may encounter a situation in which it cannot simultaneously transmit and/or receive multiple overlapping LTE-V2X and NR-V2X sidelink message transport blocks (TBs).

One of possible solutions to resolve this situation may be to directly compare priorities of overlapping LTE-V2X and NR-V2X message TBs and transmit the message TB with the higher priority. However, this solution may result in dropping one of the two overlapping transmissions, which may not be an ideal case.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
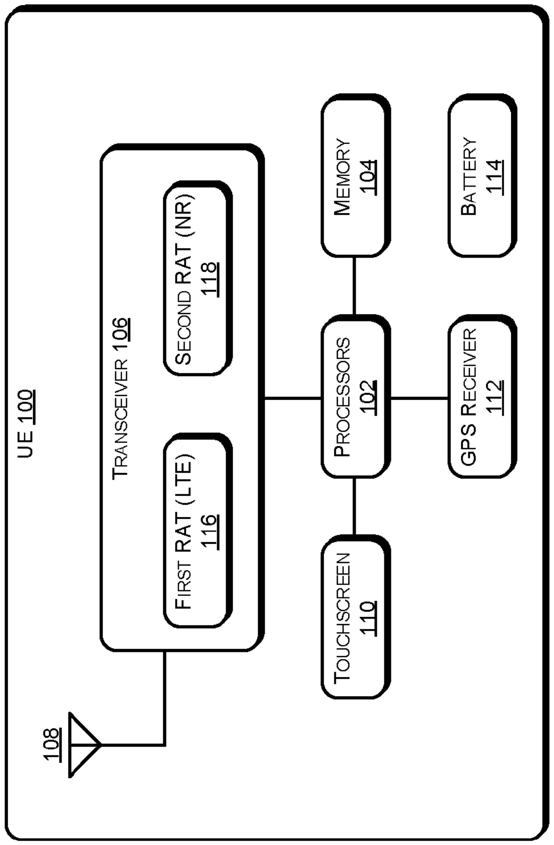
FIG. 1 illustrates an example block diagram of a UE.

A method, an apparatus, and a system for sidelink resource selection and reporting scheme, for avoiding dropped sidelink transport block (TB), such as V2X message TBs due to overlapping, conflicting, or colliding sidelink resources for LTE- and/or the NR-sidelink communications, are provided.

The LTE-V2X was developed to support basic safety messages (BSM) exchange among all road users, for example, to avoid road accidents and to provide awareness. In addition to the LTE-V2X, the main intention and/or motivation of developing the NR-V2X communication is to support more advanced V2X applications and use cases such as autonomous driving, extended sensor data sharing, and vehicle platooning. The development of the NR-V2X is often seen as the second stage of V2X communication in the evolution of intelligent transportation system (ITS). In many cases, directly comparing priorities of overlapping LTE-V2X and NR-V2X message TBs and transmitting the message TB with the higher priority may be the simplest workable solution especially when both LTE-V2X and NR-V2X radio accesses (RAs) are operating in an autonomous resource selection mode, i.e., mode 4 in LTE-V2X and mode 2 in NR-V2X regarding the road safety.

Resource scheduling and/or selection information from one RA may be provided to the other RA, which may be performed internally within a UE or between UEs, and between the LTE-V2X RA and the NR-V2X RA or within a same LTE-V2X RA or NR-V2X RA when they are operating in UE autonomous resource selection modes. Additionally, or alternatively, the resource selection information from one RA may be reported to a controlling base station (BS) to avoid allocating overlapping resources when making resource scheduling decision by the BS for the other RA. Other benefits of using the UE reporting and information exchanging scheme may include the following.

In the existing approach where the message TB priority information of the transmitting LTE-V2X TB and the transmitting NR-V2X TB are to be compared within a UE, there may be insufficient time for the signaling exchange between the RAs involved, and the UE may choose to drop a TB with a higher priority and transmit the other. However, because the resource selection information in an embodiment in accordance with the present disclosure may be parsed between the LTE-V2X and NR-V2X RAs in advance, there is a low or no risk of insufficient time for sharing or exchanging the information between the RAs.

The UE may first receive resource pools for LTE and NR sidelink communications, such as V2X communications, via a pre-configuration or a network configuration of a sidelink for the UE and may receive exchanging and reporting resource selection/reservation information in an NR sidelink communication for the UE, where a resource pool is a collection of radio resources in both time and frequency domains for which the UE may use it for sidelink communication (transmission or reception).

Sidelink resource selection/reservation information of the UE regarding one RA, such as the LTE-V2X, may be provided to another RA, such as the NR-V2X, internally within the UE. For example, to avoid the UE dropping transmission or reception of overlapping, conflicting, and/or colliding message TBs when the UE is operating in both the LTE and NR sidelink communications concurrently, the UE may exchange resource selection and/or reservation information internally between the two sidelink RAs. The sidelink communicating RA that receives the resource selection and/or reservation information may exclude any overlapping, conflicting, and/or colliding sidelink resource(s) for its V2X transmission.

The sidelink resource selection/reservation information of the UE regarding one RA may be signaled to a serving/controlling network base station (BS) of another RA, and/or resource scheduling information of the BS may be provided from one RA to another RA. For example, when one of the sidelink communicating RAs of the UE is under the control of the serving network BS, the exchanged resource selection and/or reservation information may also be reported to the serving network BS, and sidelink resource scheduling information received from the serving network BS may additionally be signaled to the other sidelink communicating RA to avoid selecting overlapping resources.

Resource allocation/selection information of the UE may be provided to at least one other UE of the same or different RA. For example, when at least two V2X/sidelink communication UEs are operating in the same or different RAs, one of the UEs may take into account of one or more resources provided by the other UE during a resource selection, or re-selection, process to either avoid or select the same resource(s).

FIG. 1 illustrates an example block diagram of a UE 100. The UE 100 may comprise one or more processors (processors) 102 communicatively coupled to memory 104, a transceiver 106 having one or more antennas (antennas) 108, an input/output (I/O) interface, such as a touchscreen 110, a Global Positioning System (GPS) receiver 112, and a battery 114, which supplies power to the components in the UE 100. The transceiver 106 may comprise multiple wireless RATs and be capable of performing sidelink communications, such as the LTE-V2X communication and NR-V2X communication utilizing respective RAs, such as a first RAT 114 for the LTE-V2X communications and a second RAT 116 for the NR-V2X communications. The transceiver 106 may generally comprise other radio frequency (RF) circuits and components (not shown), such as an RF transmitter(s), an RF receiver(s), a local oscillator, a mixer, and filters. The transceiver 106 may down-convert received RF signals such that the down-converted received RF signals may be processed, for example, extracting data. The transceiver 106 may also up-convert data to RF signals to be transmitted. The transceiver 106 may also provide link performance parameters, such as Signal-to-Interference-plus-Noise Ratio (SINR), Reference Signals Received Power (RSRP), Channel Quality Indicator, (CQI), and the like. The UE 100 may further comprise other components (not shown), such as a subscriber identity module (SIM), a near field communication (NFC) module, and a microphone (not shown).

In some embodiments, the processors 102 may be a central processing unit (CPU), a graphics processing unit (GPU), or both CPU and GPU, or other processing unit or component known in the art. The memory 104 may include volatile memory (such as random-access memory (RAM)) and/or non-volatile memory (such as read-only memory (ROM), flash memory, etc.). The memory 104 may also include additional removable storage and/or non-removable storage including, but not limited to, flash memory, magnetic storage, optical storage, and/or tape storage that may provide non-volatile storage of computer-readable instructions, data structures, program modules, and other data for the UE 102. The memory 104 may store computer-readable instructions that, when executed by the processors 102, may cause the processors 102 to perform operations described below.

Figure 2:
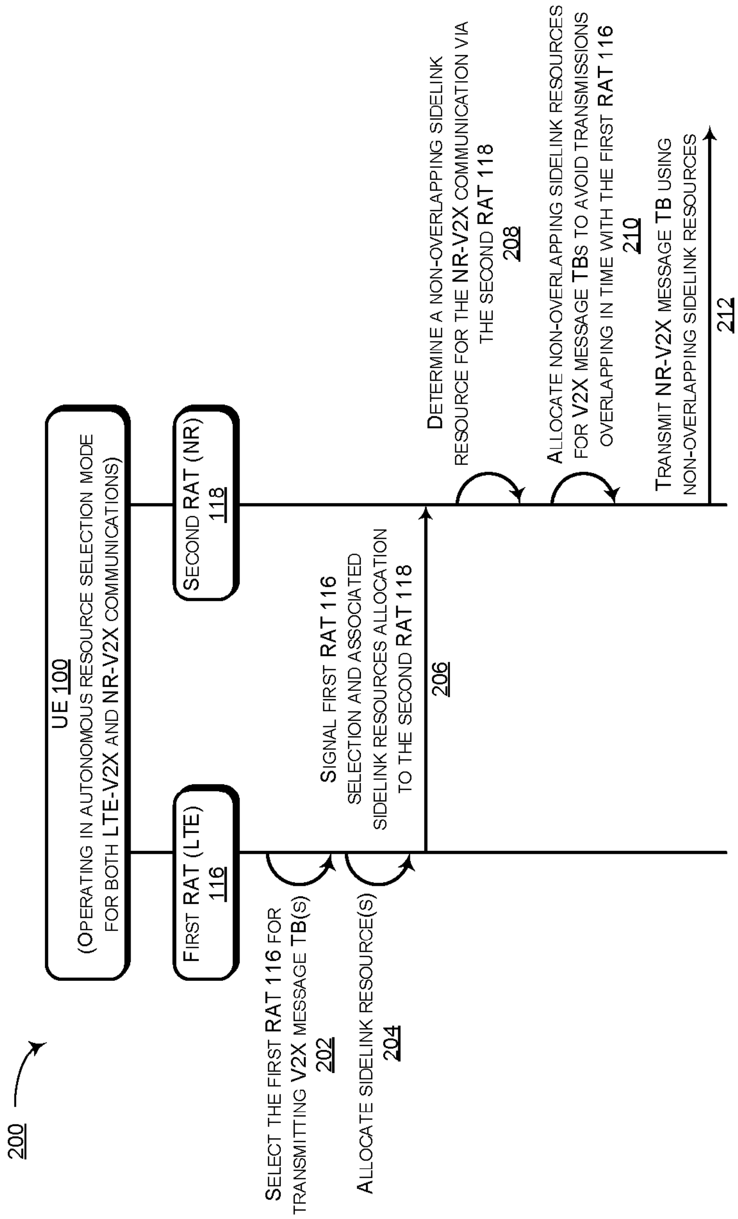
FIG. 2 illustrates an example process performed by the UE operating in an autonomous resource selection mode for both LTE and NR sidelink communications.

FIG. 2 illustrates an example process 200 performed by the UE 100 operating in an autonomous resource selection mode for both LTE and NR sidelink communications such as V2X communications.

The UE 100, operating in the autonomous resource selection mode for one or both of LTE-V2X and NR-V2X communications (i.e., mode 4 in the LTE-V2X and mode 2 in the NR-V2X), may select the first radio access (RA) such as the first RAT 116 for transmitting sidelink TB(s) such as V2X TB(s), i.e., via the LTE-V2X communication at step 202 and select, or allocate, sidelink resource(s) of the first RAT 116 at step 204. At step 206, the UE 100, or the first RAT 116 autonomously, may provide information regarding the selection of the first RAT 116 and the allocation of the associated sidelink resources to the second RAT 118. For example, the information regarding the selection of the first RAT 116 may be made available for, discoverable by, or known to, the second RAT 118. In the second RAT 118, the signaled resource selection/allocation information from the first RAT 116 may be evaluated at step 208, and a selection of sidelink resources for the V2X message TBs utilizing the second RAT 118, i.e., via the NR-V2X communication, may be made to avoid time overlapping transmissions with the first RAT 116 at step 210. For example, the resource allocation/selection information of the selected sidelink resources from the first RAT 116 may be exchanged or signaled to the second RAT 118. Because basic safety messages to be transmitted via the LTE-V2X, i.e., utilizing the first RAT 116, are generally periodic and predicable in nature, the resource allocation/selection information from the first RAT 116 may be used for determining a non-conflicting, or non-overlapping in time, sidelink resource for the NR-V2X message transmission via the second RAT 118 while the first RAT 116 is transmitting the LTE-V2X message TBs. At step 212, the NR-V2X message TB may be transmitted using the non-overlapping sidelink resource of the second RAT 118.

Figure 3:
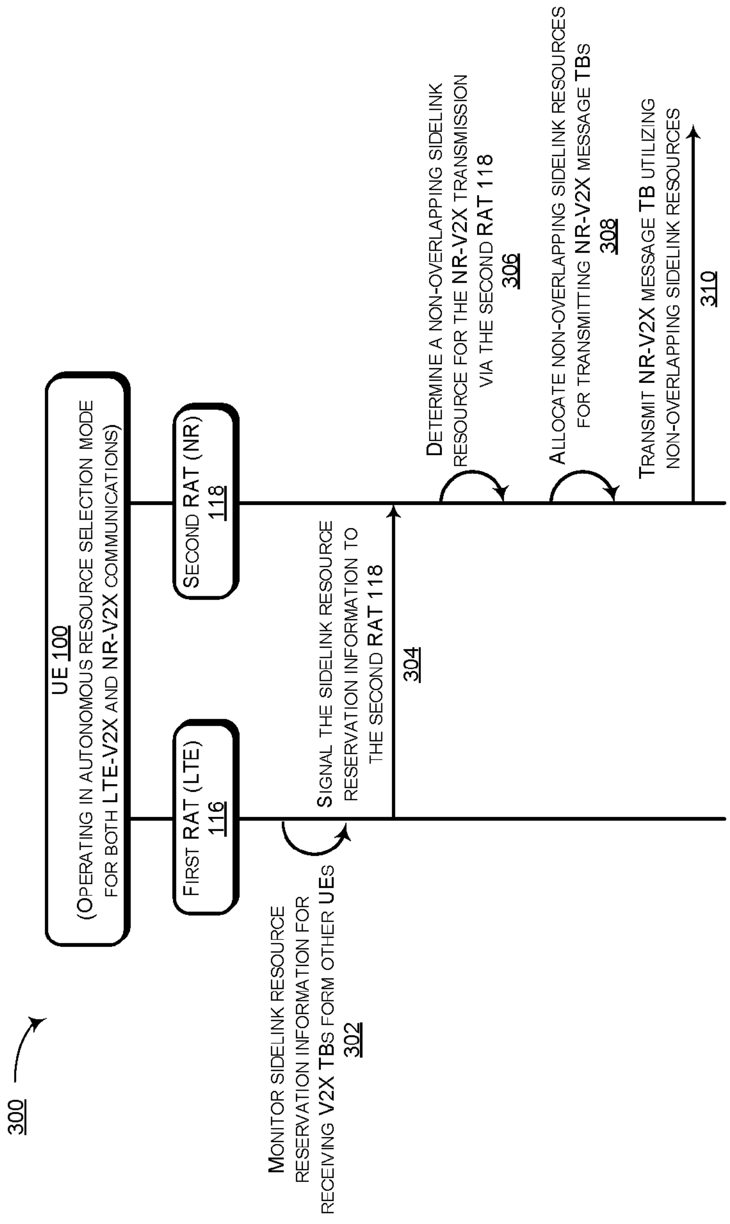
FIG. 3 illustrates another example process performed by the UE operating in an autonomous resource selection mode for both LTE and NR sidelink communications.

FIG. 3 illustrates another example process 300 performed by the UE 100 operating in an autonomous resource selection mode for both LTE and NR sidelink communications such as V2X communications.

At step 302, the UE 100 may monitor sidelink resource reservation information in the first RAT 116 for receiving V2X TBs from other UEs, i.e., receiving LTE-V2X messages. At step 304, the first RAT 116 may signal the sidelink resource reservation information to the second RAT 118. In the second RAT 118, the sidelink resource reservation information from the first RAT 116 may be evaluated at step 306 for determining a non-conflicting, or non-overlapping in time, sidelink resource for the NR-V2X message TB transmission via the second RAT 118 while the first RAT 116 is receiving the LTE-V2X messages. At step 308, the non-overlapping sidelink resources may be allocated for transmitting the NR-V2X message TBs via the second RAT 118, thus avoiding overlapping sidelink transmission and reception at the same time, and the NR-V2X message TBs may be transmitted via the second RAT 118 utilizing the non-overlapping sidelink resources at step 310. Because basic safety messages to be received via the LTE-V2X are generally periodic and predicable in nature, the sidelink resource reservation information from first RAT 116, i.e., the LTE-V2X, may be exchanged, or signaled, to the second RAT 118, i.e., the NR-V2X, which may be particularly important and useful for intra-band sidelink communications.

Figure 4A:
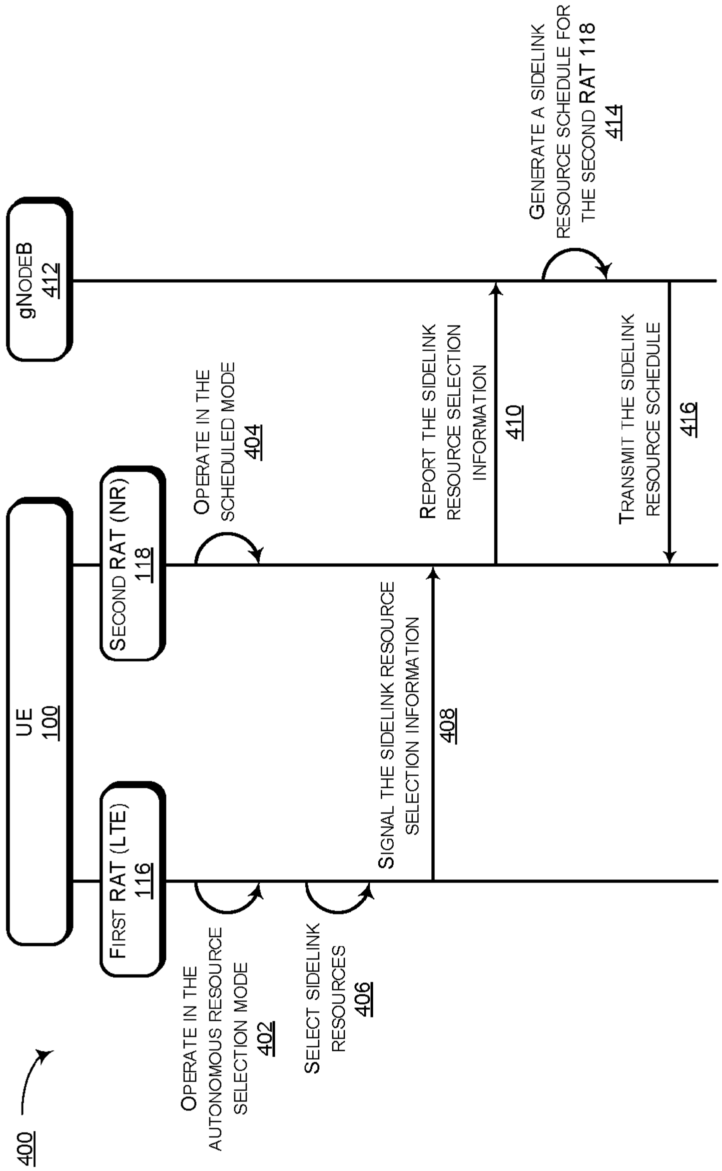
FIGS. 4A and 4B illustrate example processes performed by the UE operating in multiple modes for the LTE and NR sidelink communications.
Figure 4B:
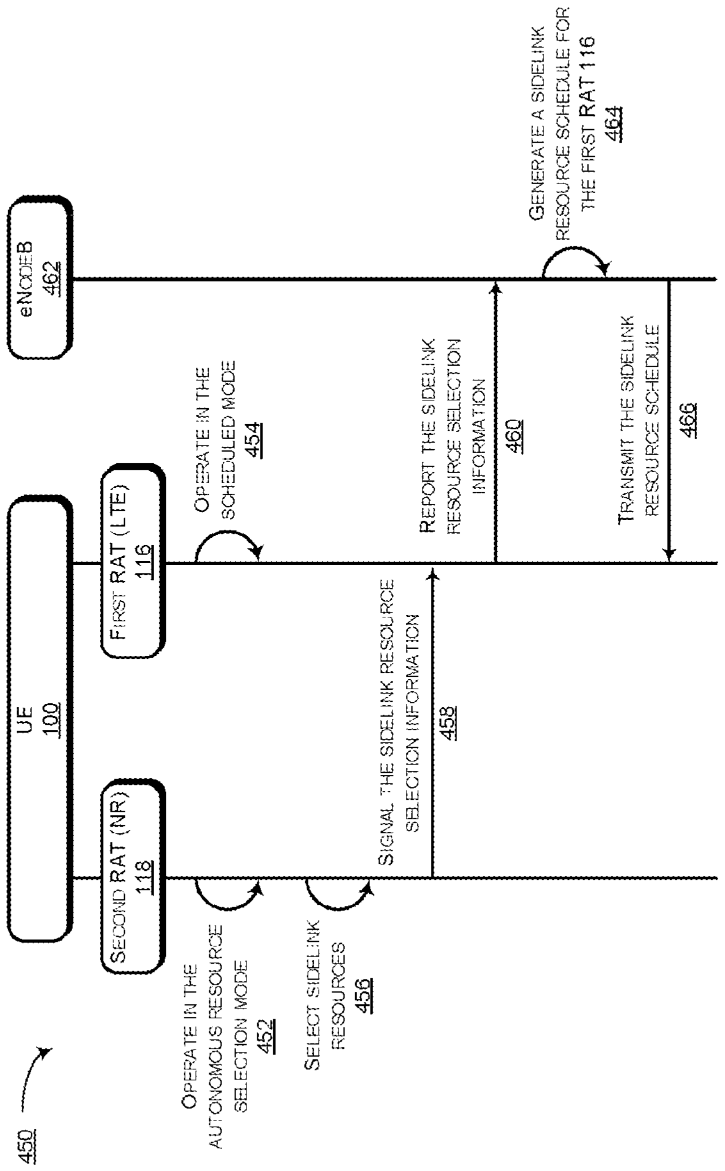

FIGS. 4A and 4B illustrate example processes performed by the UE 100 operating in multiple modes for the LTE and NR sidelink communications such as V2X communications.

The UE 100 operating in the mixed mode may be described as 1) the UE 100 operating in the autonomous resource selection mode for the LTE-V2X communication (mode 4) while operating in the scheduled mode for the NR-V2X communication (mode 1), or 2) the UE 100 operating in the autonomous resource selection mode for the NR-V2X communication (mode 2) while operating in the scheduled mode for the LTE-V2X communication (mode 3).

In FIG. 4A, the UE 100, performing the process 400, is shown to be operating in the autonomous resource selection mode for the LTE-V2X communication and in the schedule mode for the NR-V2X communication. At step 402, the UE 100 may start operating in the autonomous resource selection mode for the LTE-V2X communication, i.e., the first RAT 116, and, at step 404, start operating in the scheduled mode for the NR-V2X communication, i.e., the second RAT 118. Steps 402 and 404 may also occur, or be executed, concurrently. The UE 100 may then autonomously select, via the RAT operating in the autonomous resource selection mode, i.e., the first RAT 116 in this example, sidelink resources for the first RAT 116 at step 406, and signal the sidelink resource selection information in the first RAT 116 to the other RAT operating in the scheduled mode, i.e., the second RAT 118 in this example, at step 408. At step 410, the UE 100 may report, via the second RAT 118 operating in the scheduled mode, the sidelink resource selection information to a network base station (BS), such as a gNodeB 412. At step 414, the gNodeB 412 may generate a sidelink resource schedule for the second RAT 118, which avoids time overlapping resource scheduling with the first RAT 116, based on the reported sidelink resource selection information of the first RAT 116, and transmit, to the second RAT 118, the sidelink resource schedule for the second RAT 118 at step 416. The second RAT 118 may utilize sidelink resources based on the sidelink resource schedule received from the gNodeB 412 thus avoiding conflicting resource selections with the first RAT 116.

In FIG. 4B, the UE 100, performing the process 450, is shown to be operating in the autonomous resource selection mode for the NR-V2X communication and in the schedule mode for the LTE-V2X communication. At step 452, the UE 100 may start operating in the autonomous resource selection mode for the NR-V2X communication, i.e., the second RAT 118 and, at step 454, start operating in the scheduled mode for the LTE-V2X communication, i.e., the first RAT 116. Steps 452 and 454 may also occur, or be executed, concurrently. The UE 100 may then autonomously select, via the RAT operating in the autonomous resource selection mode, i.e., the second RAT 118 in this example, sidelink resources at step 456, and signal the sidelink resource selection information in the second RAT 118 to the other RAT operating in the scheduled mode, i.e., the first RAT 116 in this example, at step 458. At step 460, the UE 100 may report, via the first RAT 116 operating in the scheduled mode, the sidelink resource selection information to a network base station (BS), such as an eNodeB 462. At step 464, the eNodeB 462 may generate a sidelink resource schedule for the first RAT 116, which avoids time overlapping resource scheduling with the second RAT 118, based on the reported sidelink resource selection information of the second RAT 118, and transmit to the first RAT 116 the sidelink resource schedule for the first RAT 116 at step 466. The first RAT 116 may utilize sidelink resources based on the sidelink resource schedule received from the eNodeB 462 thus avoiding conflicting resource selections with the second RAT 118.

Figure 5A:
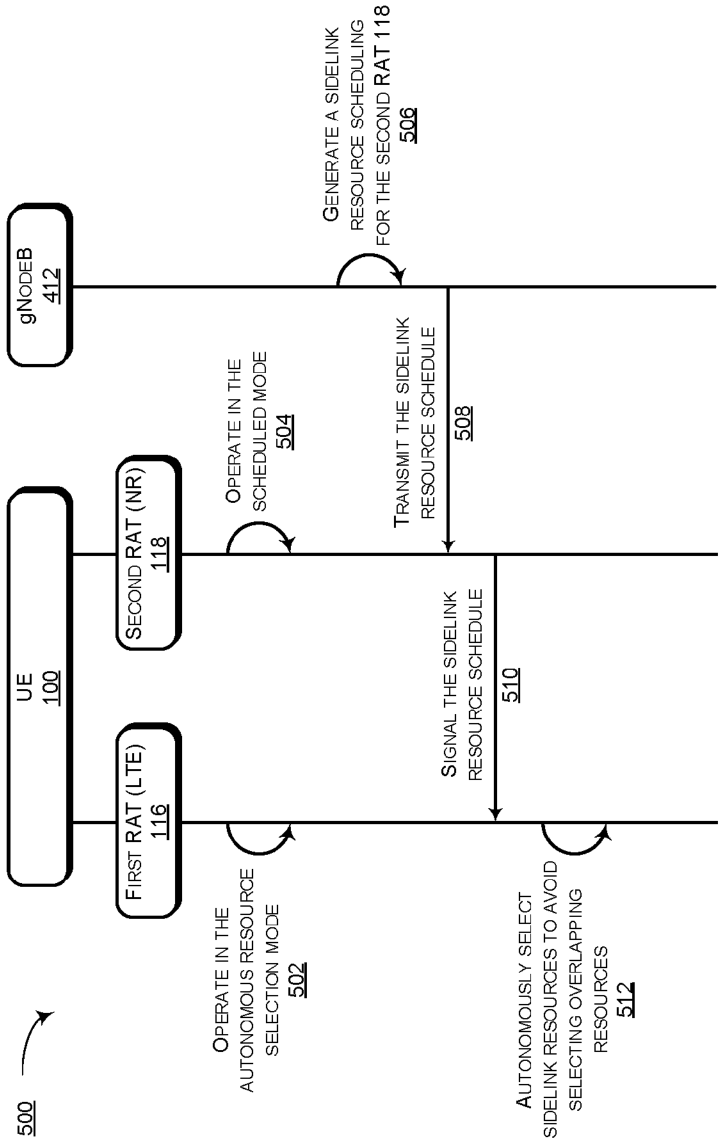
FIGS. 5A and 5B illustrate other example processes performed by the UE operating in multiple modes for the LTE and NR sidelink communications.
Figure 5B:
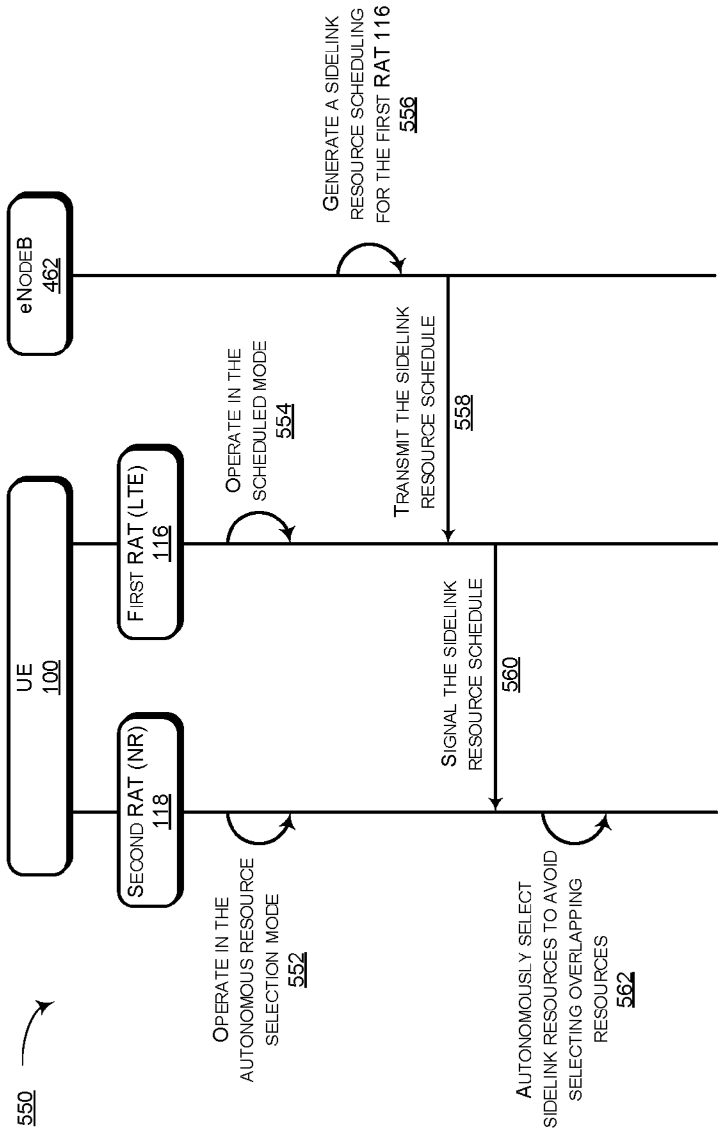

FIGS. 5A and 5B illustrate other example processes performed by the UE 100 operating in multiple modes for the LTE and NR sidelink communications such as V2X communications.

In FIG. 5A, the UE 100, performing the process 500, is shown to be operating in the autonomous resource selection mode for the LTE-V2X communication and in the schedule mode for the NR-V2X communication. At step 502, the UE 100 may start operating in the autonomous resource selection mode for the LTE-V2X communication, i.e., the first RAT 116, and, at step 504, start operating in the scheduled mode for the NR-V2X communication, i.e., the second RAT 118. Steps 502 and 504 may also occur, or be executed, concurrently. At step 506, a network BS in communication with the UE 100, such as the gNodeB 412, may generate a sidelink resource schedule for a RAT operating in the scheduled mode, i.e., the second RAT 118, and provide, or transmit, the sidelink resource schedule to the second RAT 118 at step 508. The sidelink resource schedule may also be generated in advance. The RAT operating in the scheduled mode, i.e., the second RAT 118, may receive the sidelink resource schedule from the gNodeB 412, and in response, may signal, or provide, the sidelink resource schedule to the RAT operating in the autonomous resource selection mode, i.e., the first RAT 116, at step 510, and the first RAT 116 may autonomously select sidelink resources based on the sidelink resource schedule to avoid selecting time overlapping resources with the second RAT 118 at step 512.

In FIG. 5B, the UE 100, performing the process 550, is shown to be operating in the autonomous resource selection mode for the NR-V2X communication and in the schedule mode for the LTE-V2X communication. At step 552, the UE 100 may start operating in the autonomous resource selection mode for the NR-V2X communication, i.e., the second RAT 118, and, at step 554, start operating in the scheduled mode for the LTE-V2X communication, i.e., the first RAT 116. Steps 552 and 554 may also occur, or be executed, concurrently. At step 556, a network BS in communication with the UE 100, such as the eNodeB 462, may generate a sidelink resource schedule for a RAT operating in the scheduled mode, i.e., the first RAT 116, and provide, or transmit, the sidelink resource schedule to the first RAT 116 at step 558. The sidelink resource schedule may also be generated in advance. The RAT operating in the scheduled mode, i.e., the first RAT 116, may receive the sidelink resource schedule from the eNodeB 462, and in response, may signal, or provide, the sidelink resource schedule to the RAT operating in the autonomous resource selection mode, i.e., the second RAT 118, at step 560, and the second RAT 118 may autonomously select sidelink resources based on the sidelink resource schedule to avoid selecting time overlapping resources with the first RAT 116 at step 562.

Figure 6:
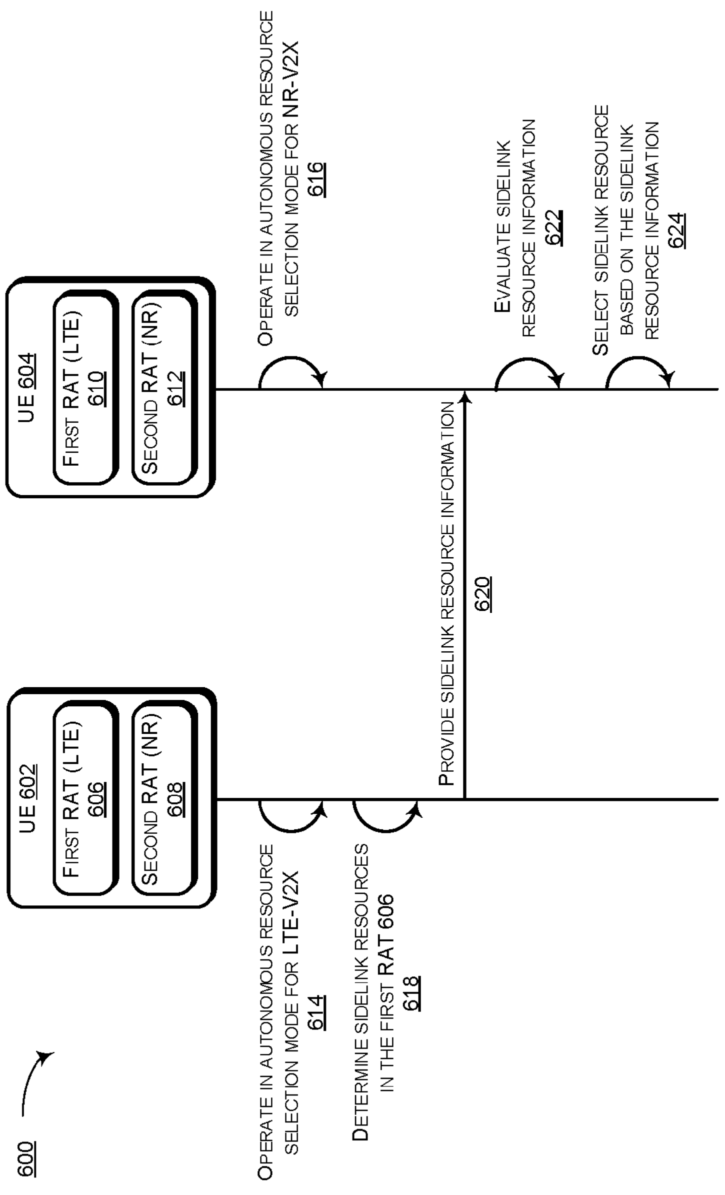
FIG. 6 illustrates an example process performed among two or more UEs for exchanging resource allocation information.

FIG. 6 illustrates an example process 600 performed among two or more UEs for exchanging resource allocation information.

Although the process 600 may be applicable to two or more UEs, two UEs 602 and 604, similar to the UE 100 described above, are shown in FIG. 6 for simplicity. Each of UEs 602 and 604 may comprise one or more RATs capable of V2X communication similar to those described above with reference to FIG. 1. For example, the UE 602 may comprise at least one of a first RAT 606 for the LTE-V2X communications or a second RAT 608 for the NR-V2X communications, and the UE 604 may comprise at least one of a first RAT 610 for the LTE-V2X communications or a second RAT 612 for the NR-V2X communications.

At least two UEs, such as the UEs 602 and 604, may both operate in an autonomous resource selection mode. For example, the UE 602 may operate in the autonomous resource selection mode for the LTE-V2X communications (mode 4) and the UE 604 for the NR-V2X communication (mode 2), or both UEs 602 and 604 may operate in the autonomous resource selection modes in the LTE-V2X communications (mode 4) or NR-V2X communications (mode 2). In this example, the UE 602 is illustrated to operate in the autonomous resource selection mode for the LTE-V2X communications via the first RAT 606 at step 614 and the UE 604 is illustrated to operate in the autonomous resource selection mode for the NR-V2X communications via the second RAT 612 at step 616. At step 618, one of the UEs, such as the UE 602, may determine, or select, one or more sidelink resources in the first RAT 606 for the LTE-V2X communications and may provide sidelink resource information regarding the determined sidelink resources in the first RAT 606 to the UE 604 at step 620. Although, in this example, the UE 602 and UE 604 are shown to be operating with different RATs, the UEs 602 and 604 may also be operating with the same RAT as described above.

At step 622, the UE 604 may evaluate the sidelink resource information provided by the first RAT 606 and, at step 624, may select resources for sidelink communications that avoid time overlapping transmissions and/or receptions with the UE 602 based on the sidelink resource information. Alternatively, the sidelink resource information from the UE 602 may be treated as a request, which may be a suggestion, recommendation, or order, from the UE 602 regarding a sidelink resource selection for the UE 604. At step 622, the UE 604 may take the suggestion/recommendation into account during evaluation of the sidelink resource information and, at step 624, may select one or more suggested/recommended resources or not to exclude the suggested or recommended resources during resource selection for sidelink communications based on the request. For example, the UE 602 may select one or more sidelink resources associated with the sidelink resource information, or refrain from excluding sidelink resources or resource timings associated with the sidelink resource information. This use of the request of selecting one of the suggested/recommended sidelink resources may be particularly beneficial in mitigating a hidden node problem in sidelink and/or V2X communications and in coordinating transmission timings among UEs in the same groupcast or unicast communication. For example, the request or the suggestion/recommendation from the UE 602 may include sidelink resources that are not reserved or to be used by other UEs hidden from or undetectable by the UE 604. By following or selecting one or more of the suggested/recommended resources provided in the sidelink resource information from the UE 602, the V2X/sidelink transmission from the UE 604 will likely result in a collision free transmission. For another example, the request from the UE 602 may be a set of transmission timings that the UE 604 should follow so that its V2X/sidelink transmissions can be heard by other UEs within the same groupcast or unicast communication. The determined sidelink resources described above may also be expressed as NR slots, LTE subframe timings, and/or the actual resource time and frequency locations.

In general, the UE reporting of resource selection information and a sidelink resource schedule of one RAT to the BS of the other RAT such as the UE 100 reporting the sidelink resource selection information as described in reference to steps 410 and 460, and/or exchanging this information between the LTE- and NR-V2X within the UE, such as signaling of the sidelink resource selection information from the first RAT 116 to the second RAT 118 as described above with reference to steps 206, 304, 408, 458, 510, and 560, or between UEs, such as between the UEs 602 and 604 as described above with reference to FIG. 6, may be performed periodically (e.g. every 100 ms from the LTE-V2X to the NR-V2X) or event triggered (e.g. from the NR-V2X to the LTE-V2X, or when a conflict or collision is detected). Additionally, the reported or signaled sidelink resource selection information may include one or more of the periodicity of the selected resources, time and/or frequency location and size of the selected resources, priority of the intended V2X message TB, and NR slot and/or LTE subframe timings of the selected sidelink resources. Further, to limit the amount of information payload to be exchanged or signaled between V2X RATs, such as the first RAT 116 and the second RAT 118, reporting to, or from, the network BS, such as the gNodeB 412 or the eNodeB 462, and/or between UEs, such as the UEs 602 and 604, the exchanging, signaling and/or reporting of information may be restricted to V2X message TBs having priority higher than a certain threshold level, which may be configured, or pre-configured, to the UE, such as the UE 100.

Some or all operations of the methods described above can be performed by execution of computer-readable instructions or computer executable modules stored on a computer-readable storage medium, as defined below. The term "computer-readable instructions" and "computer executable modules" as used in the description and claims, include routines, applications, application modules, program modules, programs, components, data structures, algorithms, and the like. Computer-readable instructions and computer executable modules can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions or computer executable modules stored on one or more non-transitory computer-readable storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A method performed by a user equipment (UE), the method comprising: selecting at least one sidelink resource from a first radio access (RA) of the UE for transmitting a sidelink transport block (TB); providing first RA selection information associated with the at least one sidelink resource selected from the first RA to a second RA of the UE; and based on the first RA sidelink resource selection information, allocating sidelink resources from the second RA.

B. The method according to paragraph A, wherein the UE is operating in an autonomous resource selection mode for at least one of the first RA or the second RA.

C. The method according to paragraph B, wherein: the first RA is a long-term evolution (LTE RA and the second RA is a new radio (NR) RA, or the first RA is an NR RA and the second RA is an LTE RA.

D. The method according to paragraph A, wherein based on the first RA sidelink resource selection information, allocating the sidelink resources from the second RA includes: determining non-overlapping sidelink resources that are not overlapping in time with transmitting the sidelink TB utilizing the first RA; and allocating the non-overlapping sidelink resources to the second RA.

E. The method according to paragraph D, further comprising: transmitting a sidelink TB utilizing the non-overlapping sidelink resources via the second RA.

F. The method according to paragraph A, wherein providing the first RA sidelink resource selection information from the first RA to the second RA includes at least one of: providing the first RA sidelink resource selection information from the first RA to the second RA periodically, providing the first RA sidelink resource selection information from the first RA to the second RA based on a triggering event, or providing the first RA sidelink resource selection information from the first RA to the second RA when priority of the sidelink TB for the at least one sidelink resource is higher than a threshold level.

G. The method according to paragraph F, wherein the triggering event includes at least one of: a sidelink resource overlap with the at least one sidelink resource, or a collision of a sidelink transmission.

H. The method according to paragraph A, wherein the first RA sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

I. One or more computer readable media storing thereon computer-readable instructions that, when executed by one or more processors, cause the one or more processors to perform operations, the operations comprising: selecting at least one sidelink resource from a first radio access (RA) of a user equipment (UE) for transmitting a sidelink transport block (TB); providing first RA selection information associated with the at least one sidelink resource selected from the first RA to a second RA of the UE; and based on the first RA sidelink resource selection information, allocating sidelink resources from the second RA.

J. The one or more computer readable media according to paragraph I, wherein the UE is operating in an autonomous resource selection mode for at least one of the first RA or the second RA.

K. The one or more computer readable media according to paragraph J, wherein the first RA is a long-term evolution (LTE) RA and the second RA is a new radio (NR) RA, or the first RA is an NR RA and the second RA is an LTE RA.

L. The one or more computer readable media according to paragraph I, wherein based on the first RA sidelink resource selection information, allocating the sidelink resources from the second RA includes: determining non-overlapping sidelink resources that are not overlapping in time with transmitting the sidelink TB utilizing the first RA; and allocating the non-overlapping sidelink resources to the second RA.

M. The one or more computer readable media according to paragraph L, wherein the operations further comprise: transmitting a sidelink TB utilizing the non-overlapping sidelink resources via the second RA.

N. The one or more computer readable media according to paragraph I, wherein providing the first RA sidelink resource selection information from the first RA to the second RA includes at least one of: providing the first RA sidelink resource selection information from the first RA to the second RA periodically, providing the first RA sidelink resource selection information from the first RA to the second RA based on a triggering event, or providing the first RA sidelink resource selection information from the first RA to the second RA when priority of the sidelink TB for the at least one sidelink resource is higher than a threshold level.

O. The one or more computer readable media according to paragraph N, wherein the triggering event includes at least one of: a sidelink resource overlap with the at least one sidelink resource, or a collision of a sidelink transmission.

P. The one or more computer readable media according to paragraph I, wherein the first RA sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

Q. A user equipment (UE) comprising: one or more processors; a transceiver coupled to the one or more processors, the transceiver capable of utilizing a first radio access (RA) and a second RA; and memory coupled to the one or more processors, the memory storing thereon computer-readable instructions that, when executed by the one or more processors, cause the one or more processors to perform operations, the operations comprising: selecting at least one sidelink resource from the first RAT for transmitting a sidelink transport block (TB), providing first RA selection information associated with the at least one sidelink resource selected from the first RA to the second RA, and based on the first RA sidelink resource selection information, allocating sidelink resources from the second RA.

R. The UE according to paragraph Q, wherein the UE is operating in an autonomous resource selection mode for at least one of the first RA or the second RA.

S. The UE according to paragraph R, wherein: the first RA is a long-term evolution (LTE) RA and the second RA is a new radio (NR) RA, or the first RA is an NR RA and the second RA is an LTE RA.

T. The UE according to paragraph Q, wherein based on the first RA sidelink resource selection information, allocating the sidelink resources from the second RA includes: determining non-overlapping sidelink resources that are not overlapping in time with transmitting the sidelink TB utilizing the first RA; and allocating the non-overlapping sidelink resources to the second RA.

U. The UE according to paragraph T, wherein the operations further comprise: transmitting a sidelink TB utilizing the non-overlapping sidelink resources via the second RA.

V. The UE according to paragraph Q, wherein providing the first RA sidelink resource selection information from the first RA to the second RA includes at least one of: providing the first RA sidelink resource selection information from the first RA to the second RA periodically, providing the first RA sidelink resource selection information from the first RA to the second RA based on a triggering event, or providing the first RA sidelink resource selection information to the second RA when priority of the sidelink TB for the at least one sidelink resource is higher than a threshold level.

W. The UE according to paragraph V, wherein the triggering event includes at least one of: a sidelink resource overlap with the at least one sidelink resource, or a collision of a sidelink transmission.

X. The UE according to paragraph Q, wherein the first RA sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

Y. A method performed by a user equipment (UE), the method comprising: monitoring sidelink resource reservation information in a first radio access (RA) of the UE for receiving sidelink transport blocks (TB) from other UEs; providing the sidelink resource reservation information in the first RA to a second RA of the UE; and based on the sidelink resource reservation information, allocating sidelink resources from the second RA for transmitting a sidelink TB.

Z. The method according to paragraph Y, wherein the UE is operating in an autonomous resource selection mode for at least one of the first RA or the second RA.

AA. The method according to paragraph Y, wherein: the first RA is a long-term evolution (LTE) RA and the second RA is a new radio (NR) RA, or the first RAT is an NR RA and the second RA is an LTE RA.

AB. The method according to paragraph Y, wherein based on the sidelink resource reservation information, allocating the sidelink resources from the second RA for transmitting the sidelink TB includes: determining non-overlapping sidelink resources that are not overlapping in time with receiving the sidelink TB utilizing the first RA; and allocating the non-overlapping sidelink resources to the second RA.

AC. The method according to paragraph AB, further comprising: transmitting a sidelink TB utilizing the non-overlapping sidelink resources via the second RA.

AD. The method according to paragraph Y, wherein providing the sidelink resource reservation information to the second RA includes at least one of: providing the sidelink resource reservation information to the second RA periodically, providing the sidelink resource reservation information to the second RA based on a triggering event, or providing the sidelink resource reservation information to the second RA when priority of the sidelink TB for the sidelink resource is higher than a threshold level.

AE. The method according to paragraph AD, wherein the triggering event includes at least one of: a sidelink resource overlap with a sidelink resource in the first RAT associated with the sidelink resource reservation information, or a collision of a sidelink transmission.

AF. The method according to paragraph Y, wherein the sidelink resource reservation information includes at least one of: a periodicity of a sidelink resource in the first RA associated with the sidelink resource reservation information, a time location of the sidelink resource, a frequency location of the sidelink resource, a size of the sidelink resource, priority of an intended sidelink TB for the sidelink resource, a new radio (NR) slot of the sidelink resource, or a long-term evolution (LTE) subframe timing of the at least one sidelink resource.

AG. One or more computer readable media storing thereon computer-readable instructions that, when executed by one or more processors of a user equipment (UE), cause the one or more processors to perform operations, the operations comprising: monitoring sidelink resource reservation information in a first radio access (RA) of the UE for receiving sidelink transport blocks (TBs) from other UEs; providing the sidelink resource reservation information in the first RA to a second RA of the UE; and based on the sidelink resource reservation information, allocating sidelink resources from the second RA for transmitting a sidelink TB.

AH. The one or more computer readable media according to paragraph AG, wherein the UE is operating in an autonomous resource selection mode for at least one of the first RA or the second RA.

AI. The one or more computer readable media according to paragraph AG, wherein: the first RA is a long-term evolution (LTE) RA and the second RA is a new radio (NR) RA, or the first RA is an NR RA and the second RA is an LTE RA.

AJ. The one or more computer readable media according to paragraph AG, wherein based on the sidelink resource reservation information, allocating sidelink resources from the second RA for transmitting a sidelink TB includes: determining non-overlapping sidelink resources that are not overlapping in time with receiving the sidelink TB utilizing the first RA; and allocating the non-overlapping sidelink resources to the second RA.

AK. The one or more computer readable media according to paragraph AJ, wherein the operations further comprise: transmitting a sidelink TB utilizing the non-overlapping sidelink resources via the second RA.

AL. The one or more computer readable media according to paragraph AG, wherein providing the sidelink resource reservation information to the second RA includes at least one of: providing the sidelink resource reservation information to the second RA periodically, providing sidelink resource reservation information to the second RA based on a triggering event, or providing the sidelink resource reservation information to the second RA when priority of the sidelink TB for the sidelink resource is higher than a threshold level.

AM. The one or more computer readable media according to paragraph AL, wherein the triggering event includes at least one of: a sidelink resource overlap with a sidelink resource in the first RA associated with the sidelink resource reservation information, or a collision of a sidelink transmission.

AN. The one or more computer readable media according to paragraph AG, wherein the sidelink resource reservation information includes at least one of: a periodicity of a sidelink resource in the first RA associated with the sidelink resource reservation information, a time location of the sidelink resource, a frequency location of the sidelink resource, a size of the sidelink resource, priority of an intended sidelink TB for the sidelink resource, a new radio (NR) slot of the sidelink resource, or a long-term evolution (LTE) subframe timing of the at least one sidelink resource.

AO. A user equipment (UE) comprising: one or more processors; a transceiver coupled to the one or more processors, the transceiver capable of utilizing a first radio access (RA) of the UE and a second RA of the UE; and memory coupled to the one or more processors, the memory storing thereon computer-readable instructions that, when executed by the one or more processors, cause the one or more processors to perform operations, the operations comprising: monitoring sidelink resource reservation information in the first RA for receiving sidelink transport blocks (TBs) from other UEs; providing the sidelink resource reservation information in the first RA to the second RA; and based on the sidelink resource reservation information, allocating sidelink resources from the second RA for transmitting a sidelink TB.

AP. The UE according to paragraph AO, wherein the UE is operating in an autonomous resource selection mode for at least one of the first RA or the second RA.

AQ. The UE according to paragraph AO, wherein the first RA is a long-term evolution (LTE) RA and the second RA is a new radio (NR) RA, or the first RA is an NR RA and the second RA is an LTE RA.

AR. The UE according to paragraph AO, wherein based on the sidelink resource reservation information, allocating the sidelink resources from the second RA for transmitting the sidelink TB includes: determining non-overlapping sidelink resources that are not overlapping in time with receiving the sidelink TB utilizing the first RA; and allocating the non-overlapping sidelink resources to the second RA.

AS. The UE according to paragraph AR, wherein the operations further comprise: transmitting a sidelink TB utilizing the non-overlapping sidelink resources via the second RA.

AT. The UE according to paragraph AO, wherein providing the sidelink resource reservation information to the second RA includes at least one of: providing the sidelink resource reservation information to the second RA periodically, providing the sidelink resource reservation information to the second RA based on a triggering event, or providing the sidelink resource reservation information to the second RA when priority of the sidelink TB for the sidelink resource is higher than a threshold level.

AU. The UE according to paragraph AT, wherein the triggering event includes at least one of: a sidelink resource overlap with a sidelink resource in the first RA associated with the sidelink resource reservation information, or a collision of a sidelink transmission.

AV. The UE according to paragraph AO, wherein the sidelink resource reservation information includes at least one of: a periodicity of a sidelink resource in the first RA associated with the sidelink resource reservation information, a time location of the sidelink resource, a frequency location of the sidelink resource, a size of the sidelink resource, priority of an intended sidelink TB for the sidelink resource, a new radio (NR) slot of the sidelink resource, or a long-term evolution (LTE) subframe timing of the at least one sidelink resource.

AW. A method performed by a user equipment (UE), the method comprising: operating a first radio access (RA) of the UE for sidelink communication in an autonomous resource selection mode; operating a second RA of the UE for sidelink communication in a scheduled mode; autonomously selecting at least one sidelink resource for the first RA via the first RA; providing sidelink resource selection information associated with the at least one sidelink resource for the first RA from the first RA to the second RA; reporting, from the second RA, the sidelink resource selection information to a network base station; and receiving a sidelink resource schedule for the second RA from the network base station.

AX. The method according to paragraph AW, wherein the received sidelink resource schedule is based at least in part on the sidelink resource selection information to avoid time-overlapping sidelink resource selection with the first RA.

AY. The method according to paragraph AW, further comprising: utilizing sidelink resources for the second RA based on the received sidelink resource schedule for a sidelink transmission.

AZ. The method according to paragraph AW, wherein providing the sidelink resource selection information from the first RA to the second RA includes at least one of: providing the sidelink resource selection information from the first RA to the second RA periodically, providing the sidelink resource selection information from the first RA to the second RA based on a triggering event, or providing the sidelink resource selection information from the first RA to the second RA when priority of the sidelink TB for the at least one sidelink resource is higher than a threshold level.

BA. The method according to paragraph AZ, wherein the triggering event includes at least one of: a sidelink resource overlap with the at least one sidelink resource, or a collision of a sidelink transmission.

BB. The method according to paragraph AW, wherein the sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

BC. The method according to paragraph AW, wherein reporting, from the second RA, the sidelink resource selection information to the network base station includes at least one of: reporting the sidelink resource selection information from the second RA to the network base station periodically, reporting the sidelink resource selection information from the second RA to the network base station based on a triggering event, or reporting the sidelink resource selection information from the second RA to the network base station when priority of the sidelink TB for the at least one sidelink resource is higher than a threshold level.

BD. One or more computer readable media storing thereon computer-readable instructions that, when executed by one or more processors of a user equipment (UE), cause the one or more processors to perform operations, the operations comprising: operating a first radio access (RA) of the UE for sidelink communication in an autonomous resource selection mode; operating a second RA of the UE for sidelink communication in a scheduled mode; autonomously selecting at least one sidelink resource for the first RA via the first RA; providing sidelink resource selection information associated with the at least one sidelink resource for the first RA from the first RA to the second RA; reporting, from the second RA, the sidelink resource selection information to a network base station; and receiving a sidelink resource schedule for the second RA from the network base station.

BE. The one or more computer readable media according to paragraph BD, wherein the received sidelink resource schedule is based at least in part on the sidelink resource selection information to avoid time-overlapping sidelink resource selection with the first RA.

BF. The one or more computer readable media according to paragraph BD, wherein the operations further comprise: utilizing sidelink resources for the second RA based on the sidelink resource schedule for the sidelink transmission.

BG. The one or more computer readable media according to paragraph BD, wherein providing the sidelink resource selection information from the first RA to the second RA includes at least one of: providing the sidelink resource selection information from the first RA to the second RA periodically, providing the sidelink resource selection information from the first RA to the second RA based on a triggering event, or providing the sidelink resource selection information from the first RA to the second RA when priority of the sidelink TB for the at least one sidelink resource is higher than a threshold level.

BH. The one or more computer readable media according to paragraph BG, wherein the triggering event includes at least one of: a sidelink resource overlap with the at least one sidelink resource, or a collision of a sidelink transmission.

BI. The one or more computer readable media according to paragraph BD, wherein the sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

BJ. The one or more computer readable media according to paragraph BD, wherein reporting, from the second RA, the sidelink resource selection information to the network base station includes at least one of: reporting the sidelink resource selection information from the second RA to the network base station periodically, reporting the sidelink resource selection information from the second RA to the network base station based on a triggering event, or reporting the sidelink resource selection information from the second RA to the network base station when priority of the sidelink TB for the at least one sidelink resource is higher than a threshold level.

BK. A user equipment (UE) comprising: one or more processors; a transceiver coupled to the one or more processors, the transceiver capable of utilizing a first radio access (RA) of the UE and a second RA of the UE; and memory coupled to the one or more processors, the memory storing thereon computer-readable instructions that, when executed by the one or more processors, cause the one or more processors to perform operations, the operations comprising: operating the first RA for sidelink communication in an autonomous resource selection mode; operating the second RA for sidelink communication in a scheduled mode; autonomously selecting at least on sidelink resource for the first RA via the first RA; providing sidelink resource selection information associated with the at least one sidelink resource for the first RA from the first RA to the second RA; reporting, from the second RA, the sidelink resource selection information to a network base station; and receiving a sidelink resource schedule for the second RA from the network base station.

BL. The UE according to paragraph BK, wherein the received sidelink resource schedule is based at least in part on the sidelink resource selection information to avoid time-overlapping sidelink resource selection with the first RA.

BM. The UE according to paragraph BK, wherein the operations further comprise: utilizing sidelink resources for the second RA based on the received sidelink resource schedule for a sidelink transmission.

BN. The UE according to paragraph BK, wherein providing the sidelink resource selection information from the first RA to the second RA includes at least one of: providing the sidelink resource selection information from the first RA to the second RA periodically, providing the sidelink resource selection information from the first RA to the second RA based on a triggering event, or providing the sidelink resource selection information from the first RA to the second RA when priority of the sidelink TB for the at least one sidelink resource is higher than a threshold level.

BO. The UE according to paragraph BN, wherein the triggering event includes at least one of: a sidelink resource overlap with the at least one sidelink resource, or a collision of a sidelink transmission.

BP. The UE according to paragraph BK, wherein the sidelink resource selection information includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

BQ. The UE according to paragraph BK, wherein reporting, from the second RA, the sidelink resource selection information to the network base station includes at least one of: reporting the sidelink resource selection information from the second RA to the network base station periodically, reporting the sidelink resource selection information from the second RA to the network base station based on a triggering event, or reporting the sidelink resource selection information from the second RA to the network base station when priority of the sidelink TB for the at least one sidelink resource is higher than a threshold level.

BR. A method performed by a user equipment (UE), the method comprising: operating a first radio access (RA) of the UE for sidelink communication in an autonomous resource selection mode; operating a second RA of the UE for sidelink communication in a scheduled mode; receiving, from a network base station in communication with the UE, a sidelink resource schedule for the second RA; providing the sidelink resource schedule from the second RA to the first RA; and autonomously selecting at least one sidelink resource for the first RA via the first RA based at least in part on the sidelink resource schedule.

BS. The method according to paragraph BR, wherein the sidelink resource schedule for the second RA is generated by the network base station.

BT. The method according to paragraph BR, wherein autonomously selecting the at least one sidelink resource for the first RA via the first RA based at least in part on the sidelink resource schedule includes selecting the at least one sidelink resource for the first RA to avoid selecting time-overlapping sidelink resources with the second RA.

BU. The method according to paragraph BT further comprising: utilizing the at least one selected sidelink resource for the first RA for a sidelink transmission.

BV. The method according to paragraph BR, wherein providing the sidelink resource schedule from the second RA to the first RA includes at least one of: providing the sidelink resource schedule from the second RA to the first RA periodically, providing the sidelink resource schedule from the second RA to the first RA based on a triggering event, or providing the sidelink resource schedule from the second RA to the first RA when priority of the sidelink TB for the at least one sidelink resource is higher than a threshold level.

BW. The method according to paragraph BV, wherein the triggering event includes at least one of: a sidelink resource overlap with the at least one sidelink resource, or a collision of a sidelink transmission.

BX. The method according to paragraph BR, wherein the sidelink resource schedule includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

BY. One or more computer readable media storing thereon computer-readable instructions that, when executed by one or more processors of a user equipment (UE), cause the one or more processors to perform operations, the operations comprising: operating a first radio access (RA) of the UE for sidelink communication in an autonomous resource selection mode; operating a second RA of the UE for sidelink communication in a scheduled mode; receiving, from a network base station in communication with the UE, a sidelink resource schedule for the second RA; providing the sidelink resource schedule from the second RA to the first RA; and autonomously selecting at least one sidelink resource for the first RA via the first RA based at least in part on the sidelink resource schedule.

BZ. The one or more computer readable media according to paragraph BY, wherein the sidelink resource schedule for the second RA is generated by the network base station.

CA. The one or more computer readable media according to paragraph BY, wherein autonomously selecting the at least one sidelink resource for the first RA via the first RA based at least in part on the sidelink resource schedule includes selecting the at least one sidelink resource for the first RA to avoid selecting time-overlapping sidelink resources with the second RA.

CB. The one or more computer readable media according to paragraph CA, wherein the operations further comprise: utilizing the at least one selected sidelink resource for the first RAT for a sidelink transmission.

CC. The one or more computer readable media according to paragraph BY, wherein providing the sidelink resource schedule from the second RA to the first RA includes at least one of: providing the sidelink resource schedule from the second RA to the first RA periodically, providing the sidelink resource schedule from the second RA to the first RA based on a triggering event, or providing the sidelink resource schedule from the second RA to the first RA when priority of the sidelink TB for the at least one sidelink resource is higher than a threshold level.

CD. The one or more computer readable media according to paragraph CC, wherein the triggering event includes at least one of: a sidelink resource overlap with the at least one sidelink resource, or a collision of a sidelink transmission.

CE. The one or more computer readable media according to paragraph BY, wherein the sidelink resource schedule includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

CF. A user equipment (UE) comprising: one or more processors; a transceiver coupled to the one or more processors, the transceiver capable of utilizing a first radio access (RA) of the UE and a second RA of the UE; and memory coupled to the one or more processors, the memory storing thereon computer-readable instructions that, when executed by the one or more processors, cause the one or more processors to perform operations, the operations comprising: operating the first RA for sidelink communication in an autonomous resource selection mode; operating the second RA for sidelink communication in a scheduled mode; receiving, from a network base station in communication with the UE, a sidelink resource schedule for the second RA; providing the sidelink resource schedule from the second RA to the first RA; and autonomously selecting at least one sidelink resource for the first RA via the first RA based at least in part on the sidelink resource schedule.

CG. The UE according to paragraph CF, wherein the sidelink resource schedule for the second RA is generated by the network base station.

CH. The UE according to paragraph CF, wherein autonomously selecting the at least one sidelink resource for the first RA via the first RA based at least in part on the sidelink resource schedule includes selecting the at least one sidelink resource for the first RA to avoid selecting time-overlapping sidelink resources with the second RA.

CI. The UE according to paragraph CH, wherein the operations further comprise: utilizing the at least one selected sidelink resource for the first RAT for a sidelink transmission.

CJ. The UE according to paragraph CF, wherein providing the sidelink resource schedule from the second RA to the first RA includes at least one of: providing the sidelink resource schedule from the second RA to the first RA periodically, providing the sidelink resource schedule from the second RA to the first RA based on a triggering event, or providing the sidelink resource schedule from the second RAT to the first RAT when priority of the sidelink TB for the at least one sidelink resource is higher than a threshold level.

CK. The UE according to paragraph CJ, wherein the triggering event includes at least one of: a sidelink resource overlap with the at least one sidelink resource, or a collision of a sidelink transmission.

CL. The UE according to paragraph CF, wherein the sidelink resource schedule includes at least one of: a periodicity of the at least one sidelink resource, a time location of the at least one sidelink resource, a frequency location of the at least one sidelink resource, a size of the at least one sidelink resource, priority of an intended sidelink TB for the at least one sidelink resource, a new radio (NR) slot of the at least one sidelink resource, or a long-term evolution (LTE) subframe timing of the at least one sidelink resource.

CM. A method performed by a first user equipment (UE), the method comprising: operating a first radio access (RA) of the first UE in an autonomous resource selection mode for sidelink communications; receiving, from a second UE having a second RA, sidelink resource information including sidelink resources selected in the second RA for sidelink communications; and selecting sidelink resources in the first RA for sidelink communications based at least in part on the sidelink resource information.

CN. The method according to paragraph CM, wherein the second UE is operating the second RA in an autonomous resource selection mode for sidelink communications.

CO. The method according to paragraph CM, wherein selecting the sidelink resources in the first RA for the sidelink communications based at least in part on the sidelink resource information includes selecting the sidelink resources in the first RA that avoid time-overlapping communications with the second UE based on the sidelink resource information.

CP. The method according to paragraph CM, wherein selecting the sidelink resources in the first RA for the sidelink communications based at least in part on the sidelink resource information includes at least one of: selecting one or more sidelink resources associated with the sidelink resource information, refraining from excluding sidelink resources associated with the sidelink resource information, or refraining from excluding sidelink resource timings associated with the sidelink resource information..

CQ. The method according to paragraph CM, wherein: the first RA is a long-term evolution RA and the second RA is a new radio (NR RA, the first RA is an NR RA and the second RA is an LTE RA, the first RA and the second RA are LTE-RAs, or the first RA and second RA are NR-RAs.

CR. The method according to paragraph CM, wherein receiving, from the second UE having the second RA, the sidelink resource information includes at least one of: receiving the sidelink resource information from the second UE periodically, receiving the sidelink resource information from the second UE based on a triggering event, or receiving the sidelink resource information from the second UE when priority of the sidelink communications for the sidelink resources selected in the second RA is higher than a threshold level.

CS. The method according to paragraph CR, wherein the triggering event includes at least one of: a sidelink resource overlap with the sidelink resources selected in the second RA, or a collision of a sidelink transmission.

CT. The method according to paragraph CM, wherein the sidelink resource selection information includes at least one of: a periodicity of the sidelink resource selected in the second RA, a time location of the sidelink resource selected in the second RA, a frequency location of the sidelink resource selected in the second RA, a size of the sidelink resource selected in the second RA, priority of an intended sidelink TB for the sidelink resource selected in the second RA, a new radio (NR) slot of the sidelink resource selected in the second RA, or a long-term evolution (LTE) subframe timing of the sidelink resource selected in the second RA.

CU. One or more computer readable media storing thereon computer-readable instructions that, when executed by one or more processors of a first user equipment (UE), cause the one or more processors to perform operations, the operations comprising: operating a first radio access (RA) of the first UE in an autonomous resource selection mode for sidelink communications; receiving, from a second UE having a second RA, sidelink resource information including sidelink resources selected in the second RA for sidelink communications; and selecting sidelink resources in the first RA for sidelink communications based at least in part on the sidelink resource information.

CV. The one or more computer readable media according to paragraph CU, wherein the second UE is operating the second RA in an autonomous resource selection mode for sidelink communications.

CW. The one or more computer readable media according to paragraph CU, wherein selecting the sidelink resources in the first RA for the sidelink communications based at least in part on the sidelink resource information includes selecting the sidelink resources in the first RA that avoid time-overlapping communications with the second UE based on the sidelink resource information.

CX. The one or more computer readable media according to paragraph CU, wherein selecting the sidelink resources in the first RA for the sidelink communications based at least in part on the sidelink resource information includes at least one of: selecting one or more sidelink resources associated with the sidelink resource information, refraining from excluding sidelink resources associated with the sidelink resource information, or refraining from excluding sidelink resource timings associated with the sidelink resource information.

CY. The one or more computer readable media according to paragraph CU, wherein: the first RA is a long-term evolution (LTE) RA and the second RA is a new radio (NR) RA, the first RA is an NR RA and the second RA is an LTE RA, the first RA and the second RA are LTE-RAs, or the first RA and second RA are NR-RAs.

CZ. The one or more computer readable media according to paragraph CU, wherein receiving, from the second UE having the second RA, the sidelink resource information includes at least one of: receiving the sidelink resource information from the second UE periodically, receiving the sidelink resource information from the second UE based on a triggering event, or receiving the sidelink resource information from the second UE when priority of the sidelink communications for the sidelink resources selected in the second RA is higher than a threshold level.

DA. The one or more computer readable media according to paragraph CZ, wherein the triggering event includes at least one of: a sidelink resource overlap with the sidelink resources selected in the second RA, or a collision of a sidelink transmission.

DB. The one or more computer readable media according to paragraph CU, wherein the sidelink resource selection information includes at least one of: a periodicity of the sidelink resource selected in the second RA, a time location of the sidelink resource selected in the second RA, a frequency location of the sidelink resource selected in the second RA, a size of the sidelink resource selected in the second RA, priority of an intended sidelink TB for the sidelink resource selected in the second RA, a new radio (NR) slot of the sidelink resource selected in the second RA, or a long-term evolution (LTE) subframe timing of the sidelink resource selected in the second RA.

DC. A user equipment (UE) comprising: one or more processors; a transceiver coupled to the one or more processors, the transceiver capable of utilizing at least a first radio access (RA) of the UE; and memory coupled to the one or more processors, the memory storing thereon computer-readable instructions that, when executed by the one or more processors, cause the one or more processors to perform operations, the operations comprising: operating the first RA of the first UE in an autonomous resource selection mode for sidelink communications; receiving, from a second UE having a second RA, sidelink resource information including sidelink resources selected in the second RA for sidelink communications; and selecting sidelink resources in the first RA for sidelink communications based on the sidelink resource information.

DD. The UE according to paragraph DC, wherein the second UE is operating the second RAT in an autonomous resource selection mode for V2X communications.

DE. The UE according to paragraph DC, wherein selecting the sidelink resources in the first RA for the sidelink communications based at least in part on the sidelink resource information includes selecting the sidelink resources in the first RA that avoid time-overlapping communications with the second UE based on the sidelink resource information.

DF. The UE according to paragraph DC, wherein selecting the sidelink resources in the first RA for the sidelink communications based at least in part on the sidelink resource information includes at least one of: selecting one or more sidelink resources associated with the sidelink resource information, refraining from excluding sidelink resources associated with the sidelink resource information, or refraining from excluding sidelink resource timings associated with the sidelink resource information.

DG. The UE according to paragraph DC, wherein: the first RA is a long-term evolution (LTE) RA and the second RA is a new radio (NR) RA, the first RA is an NR RA and the second RA is an LTE- RA, the first RA and the second RA are LTE-RAs, or the first RA and second RA are NR-RAs.

DH. The UE according to paragraph DC, wherein receiving, from the second UE having the second RA, the sidelink resource information includes at least one of: receiving the sidelink resource information from the second UE periodically, receiving the sidelink resource information from the second UE based on a triggering event, or receiving the sidelink resource information from the second UE when priority of the sidelink communications for the sidelink resources selected in the second RA is higher than a threshold level.

DI. The UE according to paragraph DH, wherein the triggering event includes at least one of: a sidelink resource overlap with the sidelink resources selected in the second RA, or a collision of a sidelink transmission.

DJ. The UE according to paragraph DC, wherein the sidelink resource selection information includes at least one of: a periodicity of the sidelink resource selected in the second RA, a time location of the sidelink resource selected in the second RA, a frequency location of the sidelink resource selected in the second RA, a size of the sidelink resource selected in the second RA, priority of an intended sidelink TB for the sidelink resource selected in the second RA, a new radio (NR) slot of the sidelink resource selected in the second RA, or a long-term evolution (LTE) subframe timing of the sidelink resource selected in the second RA.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method performed by a first user equipment (UE), the method comprising:

operating a first radio access (RA) of the first UE in an autonomous resource selection mode for sidelink communications;

receiving, from a second UE operating a second RA in the autonomous resource selection mode, sidelink resource information including sidelink resources selected in the second RA for sidelink communications; and selecting sidelink resources in the first RA for sidelink communications based at least in part on the sidelink resource information;

wherein selecting the sidelink resources in the first RA for the sidelink communications based at least in part on the sidelink resource information includes:

selecting one or more sidelink resources from one or more sidelink resources recommended by the second UE in the sidelink resource information, in the first RA for the sidelink communications, wherein the selected one or more sidelink resources are one or more sidelink resources in the first RA that avoid time-overlapping communications with the second UE based on the sidelink resource information;

wherein the first RA and the second RA are NR-RAs.

2. The method of claim 1, wherein receiving, from the second UE having the second RA, the sidelink resource information includes at least one of:

receiving the sidelink resource information from the second UE periodically, receiving the sidelink resource information from the second UE based on a triggering event, or receiving the sidelink resource information from the second UE when priority of the sidelink communications for the sidelink resources selected in the second RA is higher than a threshold level.

3. The method of claim 2, wherein the triggering event includes at least one of:

a sidelink resource overlap with the sidelink resources selected in the second RA, or a collision of a sidelink transmission.

4. The method of claim 1, wherein the sidelink resource information includes at least one of:

a periodicity of the sidelink resource selected in the second RA, a time location of the sidelink resource selected in the second RA, a frequency location of the sidelink resource selected in the second RA, a size of the sidelink resource selected in the second RA, priority of an intended sidelink TB for the sidelink resource selected in the second RA, a new radio (NR) slot of the sidelink resource selected in the second RA, or a long-term evolution (LTE) subframe timing of the sidelink resource selected in the second RA.

5. One or more non-transitory computer readable media storing thereon computer-readable instructions that, when executed by one or more processors of a first user equipment (UE), cause the one or more processors to perform operations, the operations comprising:

operating a first radio access (RA) of the first UE in an autonomous resource selection mode for sidelink communications;

receiving, from a second UE operating a second RA in the autonomous resource selection mode, sidelink resource information including sidelink resources selected in the second RA for sidelink communications; and selecting sidelink resources in the first RA for sidelink communications based at least in part on the sidelink resource information;

wherein selecting the sidelink resources in the first RA for the sidelink communications based at least in part on the sidelink resource information includes:

selecting one or more sidelink resources from one or more sidelink resources recommended by the second UE in the sidelink resource information, in the first RA for the sidelink communications, wherein the selected one or more sidelink resources are one or more sidelink resources in the first RA that avoid time-overlapping communications with the second UE based on the sidelink resource information;

wherein the first RA and the second RA are NR-RAs.

6. A first user equipment (UE) comprising:

one or more processors;

a transceiver coupled to the one or more processors, the transceiver capable of utilizing at least a first radio access (RA) of the first UE; and memory coupled to the one or more processors, the memory storing thereon computer- readable instructions that, when executed by the one or more processors, cause the one or more processors to perform operations, the operations comprising:

operating the first RA of the first UE in an autonomous resource selection mode for sidelink communications;

receiving, from a second UE operating a second RA in the autonomous resource selection mode, sidelink resource information including sidelink resources selected in the second RA for sidelink communications; and selecting sidelink resources in the first RA for sidelink communications based at least in part on the sidelink resource information;

wherein selecting the sidelink resources in the first RA for the sidelink communications based at least in part on the sidelink resource information includes:

selecting one or more sidelink resources from one or more sidelink resources recommended by the second UE in the sidelink resource information, in the first RA for the sidelink communications, wherein the selected one or more sidelink resources are one or more sidelink resources in the first RA that avoid time-overlapping communications with the second UE based on the sidelink resource information;

wherein the first RA and the second RA are NR-RAs.

7. The first UE of claim 6, wherein receiving, from the second UE having the second RA, the sidelink resource information includes at least one of:

receiving the sidelink resource information from the second UE periodically, receiving the sidelink resource information from the second UE based on a triggering event, or receiving the sidelink resource information from the second UE when priority of the sidelink communications for the sidelink resources selected in the second RA is higher than a threshold level.

8. The first UE of claim 7, wherein the triggering event includes at least one of:

a sidelink resource overlap with the sidelink resources selected in the second RA, or a collision of a sidelink transmission.

9. The first UE of claim 6, wherein the sidelink resource information includes at least one of:

a periodicity of the sidelink resource selected in the second RA, a time location of the sidelink resource selected in the second RA, a frequency location of the sidelink resource selected in the second RA, a size of the sidelink resource selected in the second RA, priority of an intended sidelink TB for the sidelink resource selected in the second RA, a new radio (NR) slot of the sidelink resource selected in the second RA, or a long-term evolution (LTE) subframe timing of the sidelink resource selected in the second RA.

* * * * *